March 31, 1953  LE ROY W. RANDT  2,633,208
OIL DEFLECTING MEANS
Filed Aug. 25, 1949  4 Sheets-Sheet 1
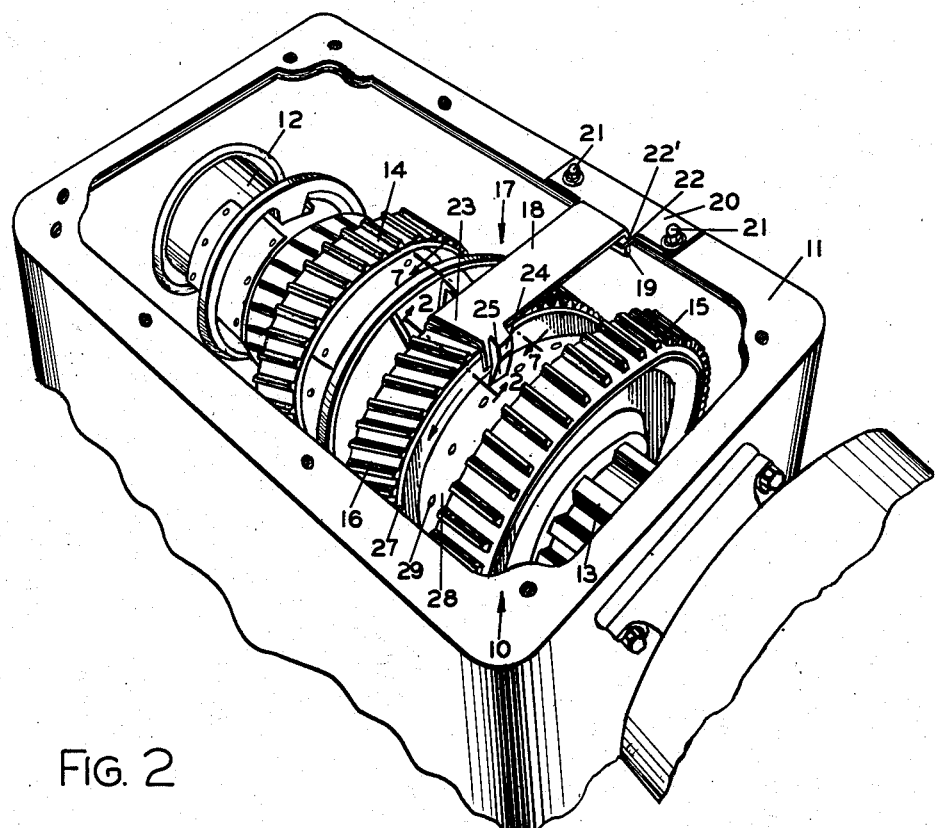
FIG. 1
FIG. 2
FIG. 7
INVENTOR.
LEROY W. RANDT
BY
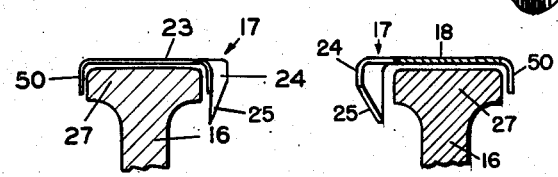
ATTY.

March 31, 1953 — LE ROY W. RANDT — 2,633,208
OIL DEFLECTING MEANS

Filed Aug. 25, 1949 — 4 Sheets-Sheet 2

INVENTOR.
LEROY W. RANDT
BY
ATTY.

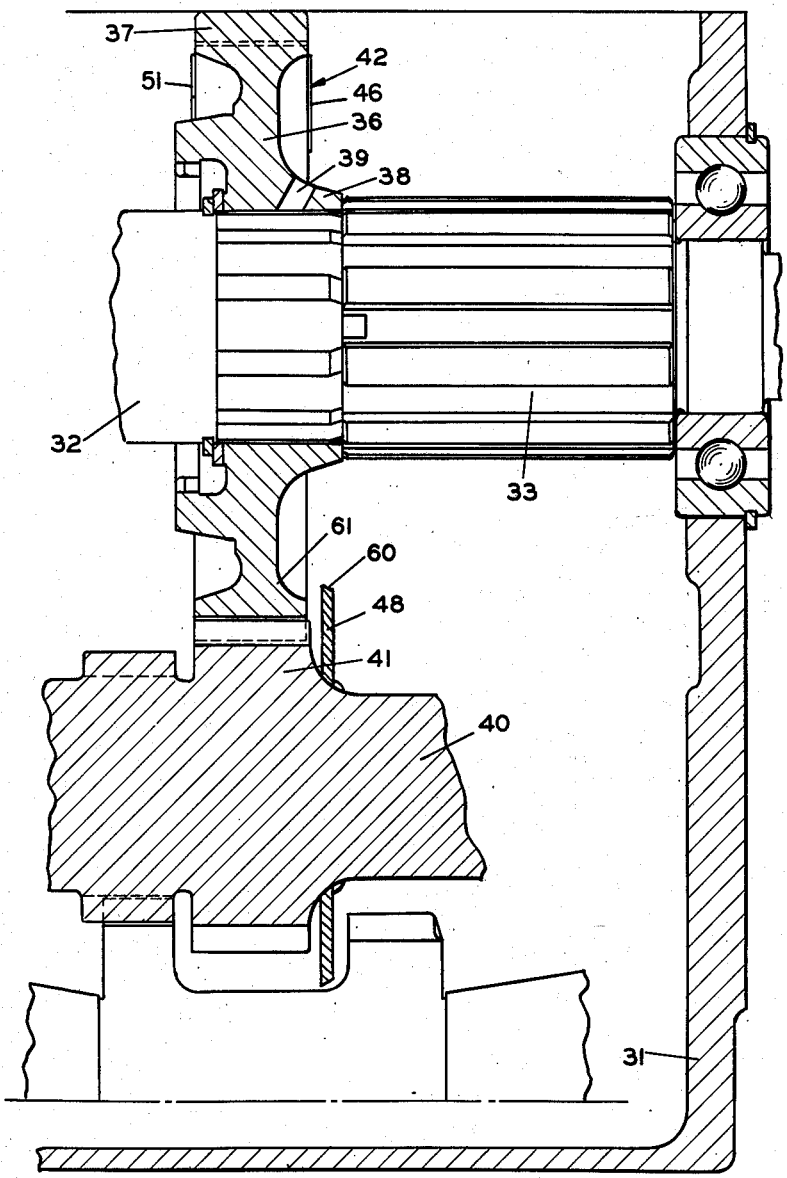

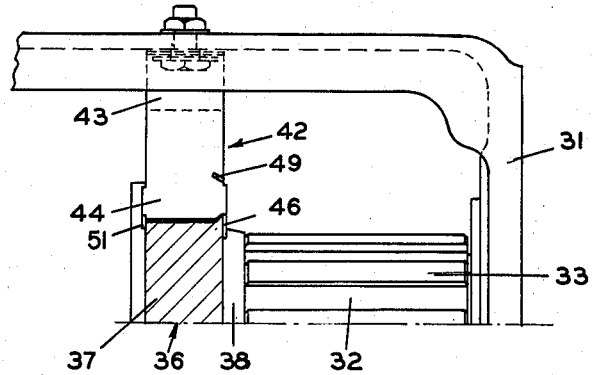
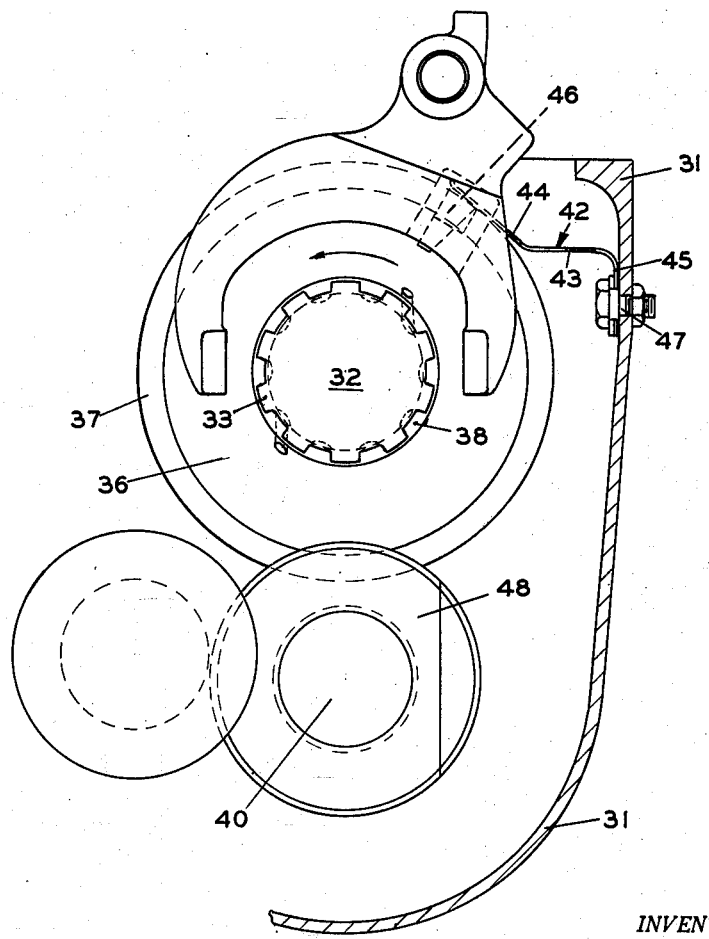

Patented Mar. 31, 1953

2,633,208

UNITED STATES PATENT OFFICE 2,633,208

OIL DEFLECTING MEANS

Le Roy W. Randt, Buchanan, Mich., assignor to Clark Equipment Company, Buchanan, Mich., a corporation of Michigan Application August 25, 1949, Serial No. 112,261

11 Claims. (Cl. 184—13)

1

My invention relates to oil deflecting means for a transmission, or the like, for effecting lubrication of a gear journalled on a shaft of the transmission.

Heretofore, it has been difficult to maintain a film of oil between the bore of a gear, journalled for rotation on a shaft of the transmission. The problem becomes acute in instances in which the shaft carrying such a gear is not submerged in an oil bath so that lubricant is able to find its way betwen the journal portion of the shaft and the bore of the gear on to bearing means, which in some instances, may be provided between the gear and the journal portion of the shaft. One approach to the problem is to provide a lubricant passageway in the shaft, for example, in the form of a bore, and having a port opening outwardly to the journal portion so that lubricant may be forced under pressure through the bore and port to lubricate the parts. This solution is not practical, primarily because of the difficulty and cost involved in fabricating the shaft in the manner referred to, and further because of the possibility of clogging the bore or port.

It is an object of my invention to provide an oil deflecting means having a deflector member of a character for collecting oil from the periphery of the gear, and deflecting it so as to effect lubrication of the gear on the shaft upon which it is rotatably mounted.

It is another object of my invention to provide an oil deflecting means of the character indicated, in which the hub portion of the gear is provided with oil directing openings to receive oil from the deflector member, and direct such oil inwardly to the bore of the gear.

It is a further object of my invention to provide an oil deflecting means, in which a disc member, or oil slinger is adapted to be mounted on a shaft spaced from the shaft upon which the gear, to be lubricated, is rotatably mounted for further aiding in lubricating the gear.

It is a still further object of my invention to provide an oil deflecting means which may be readily incorporated in present transmissions without any substantial modification thereof.

Now in order to acquaint those skilled in the art with the manner of constructing and using devices embodying my invention, I shall describe in connection with the accompanying drawings, a preferred embodiment of my invention.

In the drawings:

Figure 1 is a perspective view of a transmission, with its cover removed, incorporating one form of oil deflecting means of my invention;

Figure 2 is a sectional view taken along line

2

Figure 3:
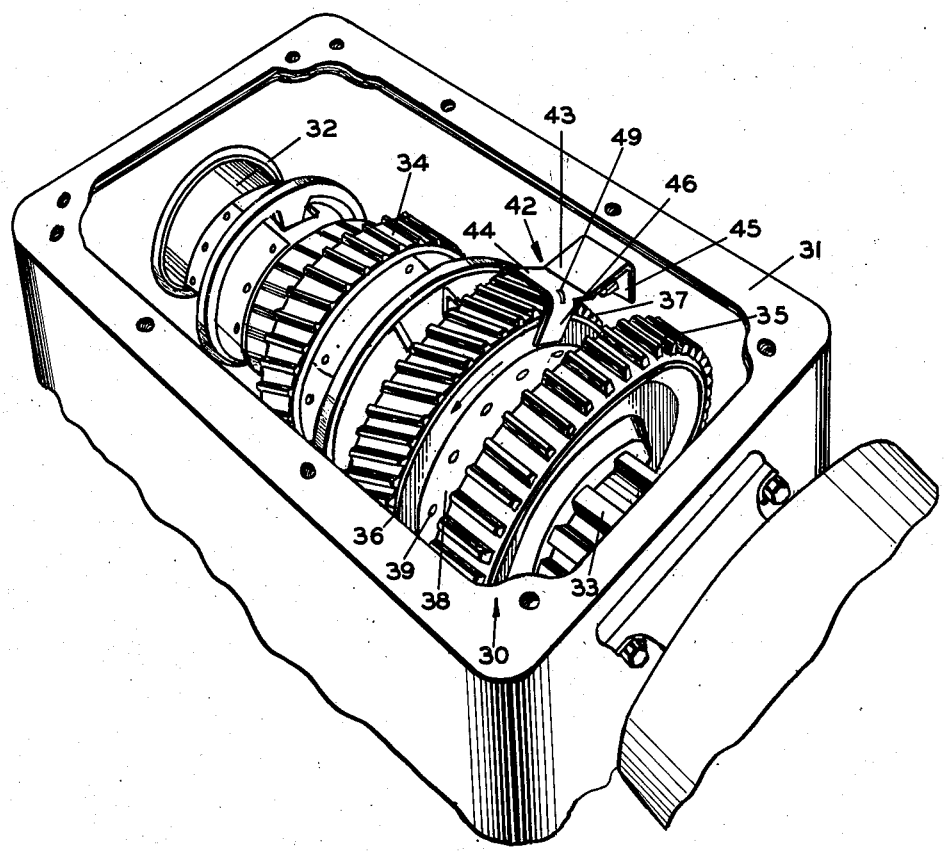

2—2 in Figure 1 looking in the direction of the arrows;

Figure 3 is a perspective view of a transmission, with its cover removed, incorporating a modified form of oil deflecting means of my invention;

Figure 4 is a partial vertical longitudinal view of the transmission of Figure 3 taken substantially along a plane extending through the axes of the transmission shafts;

Figure 5 is a transverse sectional view of the transmission of Figure 3 taken on a vertical plane spaced axially from the transmission gear provided with the oil deflecting means;

Figure 6 is a partial plan view of the portion of the transmission shown in Figure 4 and Figure 7 is a vertical sectional view of the oil deflecting means of Figure 1 taken along the line 7—7.

Now, referring to Figure 1, there is shown a transmission, indicated generally by the reference numeral 10, having a housing 11. Disposed lengthwise in the housing 11 is a main shaft 12, with certain of its portions being splined in a conventional way, as at 13. Located on the shaft 12 are a high speed gear 14, a low speed gear 15, and an intermediate speed gear 16, which may be selectively clutched to the main shaft for rotation therewith, or which may in the operation of the transmission rotate relative to the shaft on which it is carried. The gear 16 has a rim portion 27, and a hub portion 28. Extending through the hub portion 28 are a plurality of openings or bores 29, preferably directed diagonally inwardly axially with respect to shaft 12. As is known, a countershaft (not shown) in a transmission of the general type shown, is disposed lengthwise in the housing 11 below the main shaft 12, and is provided with gears adapted to engage selectively with the gears 14, 15 and 16 for varying the output speed and torque of the transmission 10. Since a transmission of this type is well known, it is believed that a more detail showing and description of it is unnecessary.

The oil deflecting means of my present invention, indicated generally by the reference numeral 17, is shown in connection with the intermediate speed gear 16. The oil deflecting means 17 comprises a substantially flat sheet metal band portion 18. The band 18 at its one end 23 is adapted to be disposed with its inner surface adjacent and substantially tangent to the rim or periphery 27 of the gear 16. As shown, the other end of the band is flanged, as at 19. Secured to the top of the housing 11, as by bolts 21, is a bracket member 20 having a flange portion 22 extending laterally inwardly of the housing 11. A slot indicated at 22' is formed in flange 22 through which the flanged end 19 of the band 18 is loosely disposed. Adjacent the end 23 of the band 18 there is a laterally disposed scoop or deflector portion 24 and a laterally disposed flange 50 shown best in Figure 2. The scoop 24 and flange 50 as shown, are directed radially inwardly of the gear 16 adjacent opposite sides thereof for aligning the band 18 above the gear 16. The open end of the scoop 24 faces the gear 16, and the lower portion of the closed end wall 25 of the scoop 24 extends angularly inwardly toward the gear 16. Preferably the scoop 24 is disposed laterally of the point of substantial tangency between the gear 16 and the end 23 of the band 18.

The operation of the above described construction is as follows:

When the transmission 10 is in operation, oil is transferred from the sump at the bottom of the housing 11, by means of a gear located on the countershaft, to the rim portion 27 and the side faces of the gear 16, with which the gear on the countershaft has meshing engagement. The oil is then carried on the rim 27 and side faces of gear 16 from the point of gear mesh to the point of substantial tangency between the gear 16 and the end 23 of the band 18. The end 23 of the band 18 then rides or floats on this film of oil, and forms a dam with the rim 27 of gear 16 which creates a head or high pressure area. The oil thus collected under pressure on the rim 27 is discharged laterally into the scoop 24. The oil carried on the side face of the gear which is adjacent the scoop 24 is collected therefrom by the adjacent portion of the scoop 24. The oil is then directed by the scoop 24 toward the openings or bores 29 formed in the hub portion 28 of the gear 16 where the direction of the oil flow is changed as it converges on the openings 29 thus imparting a velocity to the oil that overcomes the centrifugal force present that tends to prevent oil from reaching the center of the hub 28. The inner surface of the hub 28, which is journalled on the shaft 12 is thus kept well lubricated when the transmission is in operation.

A modified form of my invention is shown in Figures 3, 4, 5 and 6. Referring now to these figures, there is shown a transmission, indicated generally by the reference numeral 30 having a housing 31. Disposed lengthwise in the housing 31 is a main shaft 32 with certain of its portions being splined in a conventional way, as at 33. Located on the shaft 32 are a high speed gear 34, a low speed gear 35, and an intermediate speed gear 36, which may be selectively clutched to the main shaft for rotation therewith or which may in the operation of the transmission rotate relative to the shaft on which it is carried. The gear 36 has a rim portion 37 on a hub portion 38. Extending through the hub portion 38 are a plurality of openings or bores 39, preferably directed diagonally inwardly axially with respect to shaft 32. Disposed lengthwise in the housing 31, below the main shaft 32, is a countershaft 40, which is provided with gears, of which only one is shown, as at 41, for varying the output speed and torque of the transmission 30. Since a transmission of this type is well known, it is believed that a further detail showing or description thereof is unnecessary.

The modified form of the oil deflector of my invention, indicated generally by the reference numeral 42, is shown in connection with the intermediate speed gear 36. The oil deflecting means 42 comprises a body portion 43. The deflecting means 42 at its one end is flanged, as at 45, and is secured thereby, as by a bolt 47 to the inner side of the housing 31. Its other end 44 is directed angularly upwardly adjacent the rim 37 of the gear 36 in closely spaced relation thereto. Adjacent the end 44 of the deflecting means 42, a flange or deflector portion 46 is formed, which is directed radially inwardly laterally of the gear 36. A second radially inwardly directed flange 51 is provided in spaced relation from flange 46 for aligning the band 42 above the gear 36. The flange portion 46 may be of a slightly curved configuration rearwardly of the flat forward oil removing edge. At the junction of the upwardly directed portion 44 of the deflecting means 42 and the radially inwardly extending flange portion 46, a slot 49 is formed at an angle to extend diagonally and transversely of the helical teeth of the gear 36. Preferably the flange portion 46 and slot 49 are disposed laterally of the point of substantial tangency between the gear 36 and the end 44 of the band 42. Secured adjacent the gear 41 on the countershaft 40 is a disc member 48 which is for a purpose to be hereinafter described.

When the transmission 30 is in operation, oil is transferred from the bottom of the housing 31, by means of the rim of the gear 41 on the countershaft 40, to the rim of the gear 36 which is adapted to rotate in a counterclockwise direction as viewed in Figure 5. The end 44 of the deflecting means 42 forms a dam with the rim 37 of gear 36, thus collecting the oil from the rim 37. The slot 49 in the deflecting means 42 interrupts and changes the direction of the flow of oil carried on the periphery of rim 37 of the gear 36, and causes the collected oil to flow laterally of the gear to the flange. The oil is then directed by means of the flange 46 toward the openings or bores 39 formed in the hub portion 38 of the gear 36 imparting a velocity to the oil that overcomes the centrifugal force present that tends to prevent oil from reaching the center of the hub 38. The inner surface of the hub 38, which is journalled on the shaft 32, is thus kept well lubricated when the transmission is operating.

The aforementioned disc member or oil slinger 48 is secured adjacent the gear 41 on the countershaft 40 for purposes of increasing the amount of oil delivered to the deflector 42, which in turn increases the amount of oil directed to the inner surface of the hub 38 of gear 36. The oil adhering to the disc 48 is thrown out by centrifugal force. The peripheral edge 60 of the disc 48 is cut on an angle so that the oil being thrown therefrom is directed toward the openings or bores 39 formed in the hub portion of the gear 36.

The slinger 48 serves to increase the volume of oil delivered to the oil deflector and has utility in installations where the volume of oil transferred by meshing engagement between a pair of gears, such as gears 41 and 36, in which one gear, as for example, gear 41 rotates in an oil sump is insufficient to meet the lubrication requirements of the journalled gear 36. The oil thus deposited on the land portion 61 is caused to be thrown toward the face of the gear due to centrifugal force and is removed therefrom by oil deflecting means 42, which then directs the oil into the openings or bores 39 formed in the hub portion 38 of the gear 36.

While I have shown what I consider to be certain preferred embodiments of my invention, it will be understood that various modifications may be made therein without departing from the spirit and scope of my invention.

I claim:

1. In combination, a transmission housing having a shaft journalled therein, a gear having a rim portion and having a hub portion journalled on said shaft, oil deflecting means comprising, a band having one end thereof overlying said gear closely adjacent the rim thereof to collect oil carried on the periphery of said gear, means for loosely mounting the other end of said band to said transmission housing whereby said one end of said band is supported on the film of oil carried on the periphery of said gear, and said band having a deflector portion at said one end disposed laterally and extending radially inwardly of said gear for directing oil collected at said one end of said band toward said hub of said gear for lubricating the same.

2. In combination, a transmission housing having a shaft journaled therein, a gear having a rim portion and having a hub portion journalled on said shaft, a bore formed in said hub portion, the axis of said bore intersecting the axis of said shaft, oil deflecting means comprising, a band having one end thereof overlying said gear closely adjacent the rim thereof to collect oil carried on the periphery of said gear, and said band having a deflector portion at said one end disposed laterally and extending radially inwardly of said gear for directing oil collected at said one end of said band toward said bore in said hub of said gear for lubricating the same.

3. In combination, a transmission housing having a shaft journaled therein, a gear having a rim portion and having a hub portion journaled on said shaft, oil deflecting means comprising, a band having one end thereof overlying said gear closely adjacent the rim thereof to collect oil carried on the periphery of said gear, means for loosely mounting the other end of said band to the transmission housing whereby said one end of said band is supported on the film of oil carried on the periphery of said gear, and said band having a deflector portion at said one end disposed laterally and extending radially inwardly of said gear for directing oil collected at said one end of said band toward the hub of said gear for lubricating the same.

4. In combination, a transmission housing having a shaft journaled therein, a gear having a rim portion and having a hub portion journaled on said shaft, said hub having a plurality of bores extending therethrough, the axes of said bores intersecting the axis of said shaft, oil deflecting means comprising, a band having one end thereof overlying said gear closely adjacent the rim thereof to collect oil carried on the periphery of said gear, and said band having a deflector portion at said one end disposed laterally and extending radially inwardly of said gear for directing oil collected at said one end of said band towards said bores in said hub of said gear for lubricating the same.

5. In combination, a transmission housing having a shaft journaled therein, a gear having a rim portion and having a hub portion journaled on said shaft, said hub having a bore extending therethrough directed diagonally inwardly axially of said shaft, oil deflecting means comprising, a band thereof overlying said gear closely adjacent the rim thereof to collect oil carried on the periphery of said gear, and said band having a deflector portion at said one end disposed laterally and extending radially inwardly of said gear for directing oil collected at said one end of said band toward said bore in said hub of said gear for lubricating the same.

6. In combination, a transmission housing having a shaft journaled therein, a gear having a rim portion and having a hub portion journaled on said shaft, said hub having a plurality of bores extending therethrough directed diagonally inwardly axially with respect to said shaft, oil deflecting means comprising a band having one end thereof overlying said gear closely adjacent the rim thereof to collect oil carried on the periphery of said gear, and said band having a deflector portion at said one end disposed laterally and extending radially inwardly of said gear for directing oil collected at said one end of said band toward said bores in said hub of said gear for lubricating the same.

7. In combination, a transmission housing having a main shaft and a countershaft journaled therein, a gear having a rim portion and having a hub portion journaled on said main shaft, said hub having a plurality of bores extending therethrough directed diagonally inwardly axially with respect to said main shaft, a disc member having an angular peripheral edge mounted laterally of said gear on said countershaft for slinging oil toward said bores in said hub of said gear, oil deflecting means comprising, a band having one end thereof overlying said gear closely adjacent the rim thereof to collect oil carried on the periphery of said gear, and said band having a deflector portion at said one end disposed laterally and extending radially inwardly of said gear for directing oil collected at said one end of said band toward said bores in said hub of said gear for lubricating the same.

8. In combination, a transmission housing having a main shaft and a countershaft journaled therein, a gear having a rim portion and having a hub portion journaled on said main shaft, said hub having a plurality of bores extending therethrough directed diagonally inwardly axially with respect to said main shaft, a disc member having an angular peripheral edge mounted laterally of said gear on said countershaft for slinging oil toward said bores in said hub of said gear, oil deflecting means comprising, a band having one end thereof overlying said gear closely adjacent the rim thereof to collect oil carried on the periphery of said gear, said band having a deflector portion at said one end disposed laterally and extending radially inwardly of said gear, a slot formed in said one end of said band diagonally with respect to the teeth of said gear for interrupting and changing the direction of flow of oil carried on the periphery of said gear and causing the oil to flow laterally of said gear to said deflector portion, and said deflector portion directing oil collected at said one end of said band toward said bores in said hub of said gear for lubricating the same.

9. In combination, a transmission housing having a shaft journaled therein, a gear having a rim portion and having a hub portion journaled on said shaft, said hub having a plurality of bores extending therethrough, the axes of said bores intersecting the axis of said shaft, oil deflecting means comprising, a band having one end thereof overlying said gear closely adjacent the rim thereof to collect oil carried on the periphery of said gear, said band having a scoop portion at said one end disposed laterally and extending radially inwardly of said gear for directing oil collected at said one end of said band toward said bores in said hub of said gear for lubricating the same, and said scoop comprising an open end facing said gear and a closed end wall having the lower portion thereof extending angularly inwardly toward said gear and a single closed side wall.

10. In combination, a transmission housing having a shaft journaled therein, a gear having a rim portion and having a hub portion journaled on said shaft, said hub having a plurality of bores extending therethrough directed diagonally inwardly axially of said shaft, oil deflecting means comprising, a band having one end thereof overlying said gear closely adjacent the rim thereof to collect oil carried on the periphery of said gear, said band having a scoop portion at said one end disposed laterally and extending radially inwardly of said gear for directing oil collected at said one end of said band toward said bores in said hub of said gear for lubricating the same, and said scoop comprising an open end facing said gear and a closed end wall having the lower portion thereof extending angularly inwardly toward said gear and a single closed side wall.

11. In combination, a transmission housing having a shaft journaled therein, a gear having a rim portion and having a hub portion journaled on said shaft, said hub having a plurality of bores extending therethrough directed diagonally inwardly axially with respect to said shaft, oil deflecting means comprising, a band having one end thereof overlying said gear closely adjacent the rim thereof to collect oil carried on the periphery of said gear, said band having a deflector portion at said one end disposed laterally and extending radially inwardly of said gear, a slot formed in said one end of said band diagonally with respect to the teeth of said gear for interrupting and changing the direction of flow of oil carried on the periphery of said gear and causing the oil to flow laterally of said gear to said deflector portion, and said deflector portion directing oil collected at said one end of said band toward said bores in said hub of said gear for lubricating the same.

LE ROY W. RANDT.

REFERENCES CITED

The following references are of record in the file of this patent:

UNITED STATES PATENTS

| Number | Name | Date |
|---|---|---|
| 1,775,623 | Morgan | Sept. 9, 1930 |
| 2,015,108 | Harper | Sept. 24, 1935 |